(12) United States Patent
Cable

(10) Patent No.: US 6,186,016 B1
(45) Date of Patent: Feb. 13, 2001

(54) HIGH PRECISION ADJUSTER

(75) Inventor: Alex Cable, Newton, NJ (US)

(73) Assignee: Thorlabs, Inc., Newton, NJ (US)

( * ) Notice: Under 35 U.S.C. 154(b), the term of this patent shall be extended for 0 days.

(21) Appl. No.: 09/329,157

(22) Filed: Jun. 9, 1999

(51) Int. Cl.$^7$ .................................................. F16H 21/44
(52) U.S. Cl. .............................................................. 74/110
(58) Field of Search ................................. 74/110, 89.15, 74/424.8 R

(56) References Cited

U.S. PATENT DOCUMENTS 4,617,833 * 10/1986 Hall et al. ............................... 74/110
5,121,655 * 6/1992 Toshimitsu ........................... 74/665 B
5,762,345 * 6/1998 Nowak et al. .......................... 74/110

* cited by examiner

Primary Examiner—David Fenstermacher
(74) Attorney, Agent, or Firm—Notaro & Michalos P.C.

(57) ABSTRACT

A high precision linear adjuster for coarse and fine relative axial motion between a first member and a second member includes a sleeve fixed to the first member and a coarse adjustment body mounted for coarse axial movement to the sleeve. An actuator pin is slidably mounted in the coarse adjustment body for axial movement along an axis. The actuator pin engages the second member for moving the second member with respect to the first member with axial movement of the actuator pin. A main body is fixed to the coarse adjustment body and has a first tapered surface that is inclined with respect to the axis. The main body has a first thread. A drive screw having a second thread is threaded to the first thread for axial movement of the drive screw with respect to the main body, with rotation of the drive screw. The drive screw has a second tapered surface that is inclined with respect to the axis. A wedge plunger axially movable in the coarse adjustment body has a third tapered surface that is inclined with respect to the axis. A plurality of circumferentially spaced balls are provided around the first, second and third tapered surfaces, each ball engaging all of the surfaces and the surfaced being inclined by amounts selected so that with a relatively large axial movement of the drive means the surfaces interact with the balls to move the wedge plunger be a relatively small amount.

9 Claims, 3 Drawing Sheets

HIGH PRECISION ADJUSTER

FIELD AND BACKGROUND OF THE INVENTION

The present invention relates in general to high precision mechanical adjusters such as those utilized on microscopes, micrometers, opto-electronics, fiber optics alignment and the like, and in particular to a new and useful high precision linear adjuster.

U.S. Pat. No. 4,617,833 discloses an adjuster which utilizes a lever system for displacement. Standard screw threads cannot provide the accuracy required of today's applications. The present invention increases precision and displacement with a finer resolution while achieving a smooth linear motion output. Backlash and output rotation are eliminated while providing smooth travel even under applied load situations.

SUMMARY OF THE INVENTION

The present invention is a high precision linear translation actuator that can be used for many applications where coarse and fine adjustment are required. The invention provides linear motion between a first member and a second output member by utilizing a drive screw within an adjustment knob to advance a drive pin which activates an angle wedge drive system located within the main body. This translates an input motion into a precise displacement at the output.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
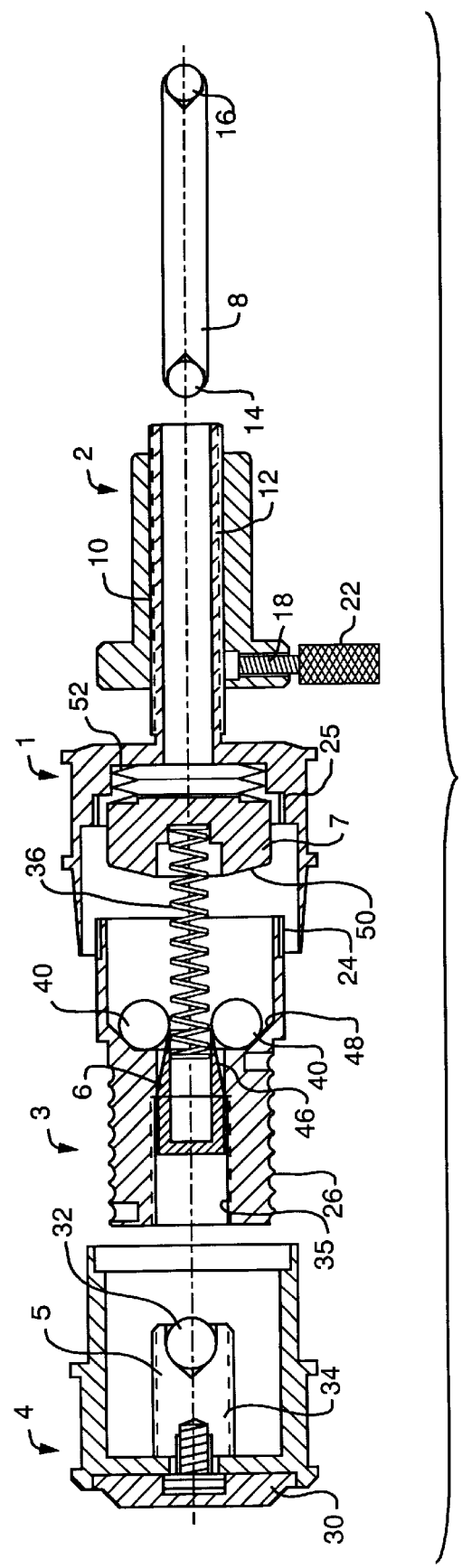
FIG. 1 is an axial sectional view of the present invention, partly exploded.

As shown in the drawings the invention embodied therein is a high precision linear adjuster which comprises a cylindrical threaded coarse adjustment body 1 is threaded at 10 into an outer threaded sleeve 2 which is held fixed within an application or instrument 20, forming a first member. An actuator pin 8 is slidably mounted within a shaft 12 of the body 1 for axial movement. Pin 8 extends past the body 1 and engages an output or second member shown schematically at 21. The pin 8 is fitted with a steel ball 14, 16 on each end for single axial point contact between output member 21 and a flat surface of a wedge plunger 7 that is mounted for sliding axial movement in body 1. Each end of pin 8 has a cylindrical opening that tappers down to a conical blind bore for receiving one of the balls 14,16.

A threaded hole 18 is provided transversely within the outer sleeve 2 for a locking screw or set screw 22. Coarse adjustment is achieved by rotating body 1 within the outer sleeve 2 until a coarse adjustment, axial position is obtained for the extension of pin 8 from first member 20 and the coarse positioning of second member 21. This coarse adjustment position is then fixed by screw 22 that holds body 1 in its set axial position to sleeve 2.

A main body 3 is threaded into body 1 at 24,25 to form the main structure of the adjuster of the invention. Threads or grooves 26 are provided externally on the main body 3 to guide and limit rotation and drive of the adjuster, internally.

A fine adjuster knob 4 is attached over the main body 3 and is inserted within a counterbored portion of coarse adjustor body 1. An annular clearance gap 28 is provided between knob 4 and body 1 for free rotation and axial adjustment of the knob. Knob 4 is fixed to a drive screw 5 by an attachment screw 30, threading into the end of drive screw 5. A cylindrical opening followed by a blind conical bore in the opposite end of drive screw 5 receives a steel ball 32. Drive screw 5 is threaded at 34, 35 into main body 3 providing advancement of internal components resulting in displacement to the output member 21 when knob 4 is rotated.

Figure 2:
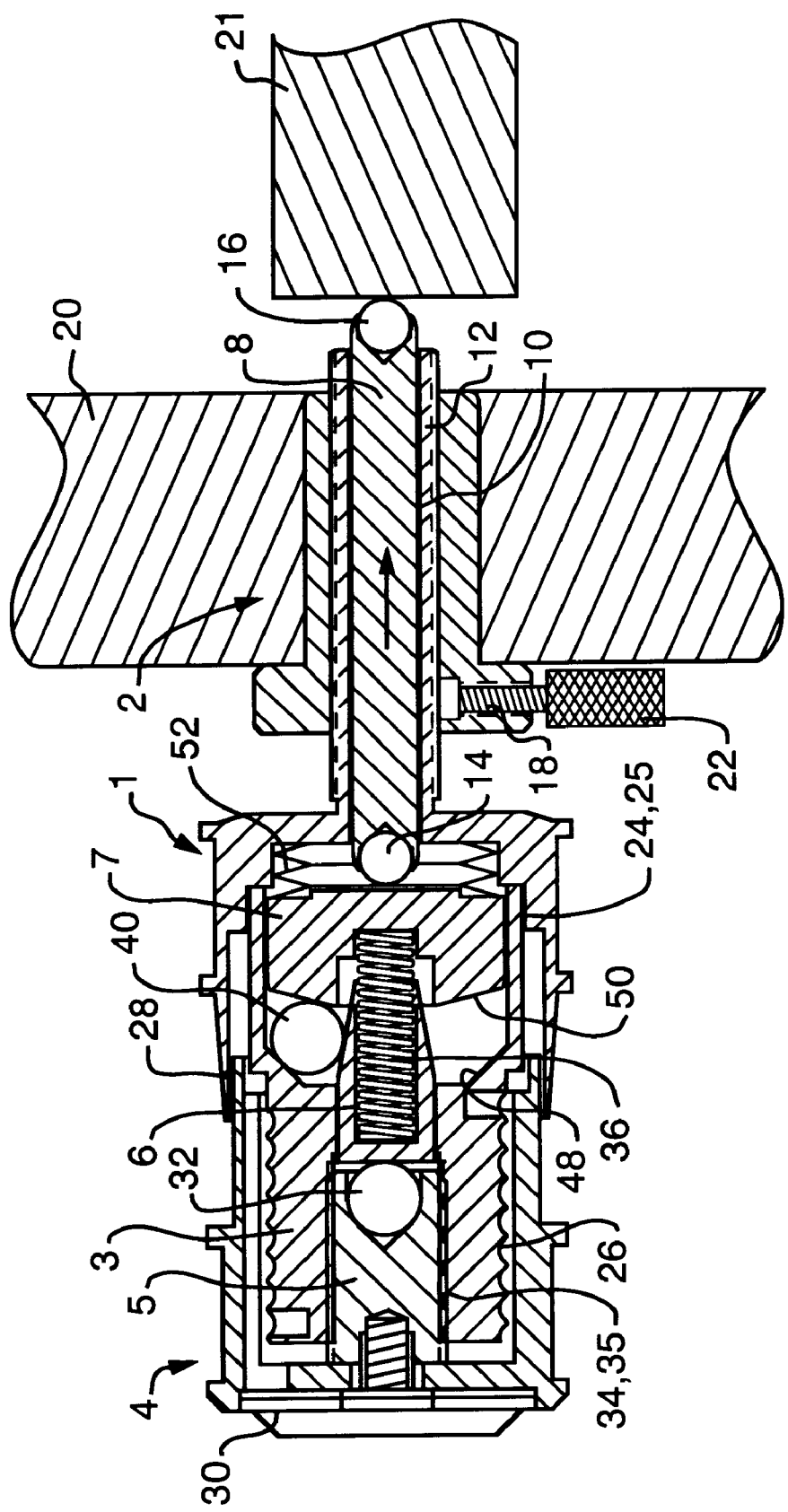
FIG. 2 is a view similar to FIG. 1 of the present invention in an assembled condition and in a first extreme leftmost adjustment position.
Figure 3:
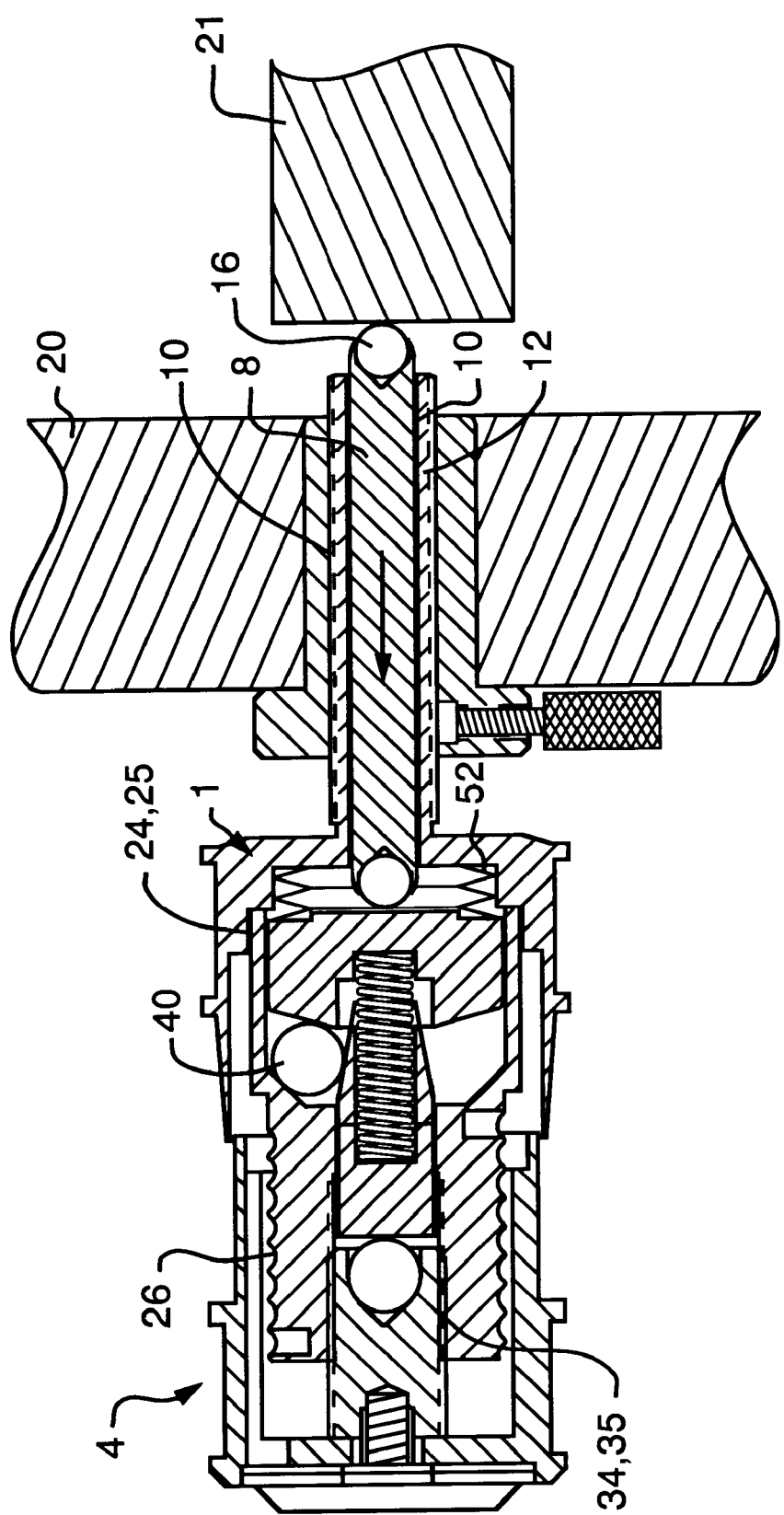
FIG. 3 is a view similar to FIG. 2 of the device in an opposite extreme rightmost position.

The following internal components make up an angle wedge drive system which provides the basis for the high precision linear output motion for member 21 when knob 4 is rotated. Within main body 3 a compression spring 36 is provided between a tapered hollow drive pin 6 and an angled drive wedge plunger 7. Three circumferentially spaced steel balls 40 are provided around an inclined surface 50 of plunger 7, within body 3, adjacent and around an outer tapered surface 46 of pin 6. The ball 40 are 120 degrees apart with nylon spacer balls added between the steel balls 40 to maintain separation. Only one of these steel balls 40 is shown in FIG. 2 and FIG. 3 and two are shown in FIG. 1.

With the balls 40 in place, three independent angles are provided so that they form a forced path for the balls to travel. Upon rotation of fine adjustment knob 4, threaded drive screw 5 is engaged to exert an axial force upon tapered drive pin 6 and the compression spring 36, thus causing the steel balls 40 to travel along paths having radial components, along three independent angles. This advances drive wedge 7 axially a small and accurate amount which moves actuator pin 8 by the same amount to provide output translation and relative linear motion to output member 21. As tapered drive pin 6 advances axially, the steel balls ride along the wedge surface 46 of the drive pin 6 in a radially outward direction while being forced to travel along a 45 degree wedge surface 48 of the main body 3, resulting in the forward motion and force of the balls advancing the drive wedge 7 and actuator pin 8 as the balls also roll along the wedge surface 50 of drive wedge 7. The outward motion and travel of the balls reduces the magnitude of the forward motion and force on the drive wedge by 10:1, providing a smooth, high precision linear translation of the actuator pin output.

The outer sleeve 2 is press-fit or held fixed within an instrument 20, not allowing any rotation. Threaded body 1 is the only component being rotated within the outer sleeve 2, for coarse adjustment. Once the desired coarse adjustment is achieved, set screw 22 in outer sleeve 2 is used to lock the coarse adjuster at its position as noted above.

Rotation of adjuster knob 4 will ultimately provide the fine adjustment movement of actuator pin 8 which glides through the shaft 12 of body 1. Since body 1 and sleeve 2 are locked against relative rotation, only advancement of the actuator pin 8 is permitted. Actuator pin 8 is not threaded and freely moves axially within the shaft 12 of body 1 by the force of drive wedge 7. Body 1 is threaded into outer sleeve 2 for the purpose of coarse adjustment only.

Additional construction notes are as follows:

Main body 3 is threaded and glued into threaded body 1. This allows adjuster knob 4 and drive screw 5 to thread into fixed main body 3 which drives the tapered pin 6 and activates the angle wedge drive system.

A stack of Belleville washers 52 are placed in counterbore of threaded body 1 to act as a spring against drive wedge or wedge plunger 7 which aides in the smooth translation of the actuator pin 8. The internal end of the actuator pin 8 is freely inserted into the shaft of body 1 and the washers to make contact with device wedge 7. The actuator pin 8 is held within the adjuster by making contact with the surface of the instrument 21 being used.

The invention offers a more economical cost of manufacture while maintaining quality. Components contained on the adjuster can be machined by the easier, inexpensive process of turning parts as opposed to milling parts which is primarily done when manufacturing similar types of adjusters. The invention provides a mechanical advantage with the angle wedge drive system by giving an effortless 10:1 reduction of input verses output translation. This results in greater resolution and sensitivity at a lesser cost while providing an increased and linear high precision displacement. The invention design eliminates backlash and output rotation while providing smooth operation and linear travel under applied load situations. As shown in FIGS. 2 and 3, knob 4 can move axially with its rotation by a total stroke S (FIG. 3) between the rightmost position of member 21 in FIG. 2, to the leftmost position in FIG. 3. This stroke S results in only about one tenth the axial motion for pin 8 and output member 21.

An alternative modification could be to adjust the angles of the wedge drive system to change the ratio of the input to output displacements. This would allow for greater or lesser changes in resolution displacement and translation.

While a specific embodiment of the invention has been shown and described in detail to illustrate the application of the principles of the invention, it will be understood that the invention may be embodied otherwise without departing from such principles.

What is claimed is:

1. A high precision linear adjuster for coarse and fine relative axial motion between a first member and a second member, the adjuster comprising:

a sleeve fixed to the first member;

a coarse adjustment body mounted for coarse axial movement to the sleeve;

an actuator pin slidably mounted in the coarse adjustment body for axial movement along an axis, the actuator pin engaging the second member for moving the second member with respect to the first member with axial movement of the actuator pin, coarse motion of the second member being caused by relative movement between the coarse adjustment body and the sleeve, and fine motion of the second member being caused by relative movement between the actuator pin and the coarse adjustment body;

a main body fixed to the coarse adjustment body and having a first tapered surface that is inclined with respect to the axis, the main body having a first thread;

drive means having a second thread threaded to the first thread for axial movement of the drive means with respect to the main body, with rotation of the drive means, the drive means having a second tapered surface that is inclined with respect to the axis;

a wedge plunger axially movable in the coarse adjustment body and having a third tapered surface that is inclined with respect to the axis; and a plurality of circumferentially spaced balls around the first, second and third tapered surfaces, each ball engaging all of the surfaces and the surfaces being inclined by amounts selected so that with a relatively large axial movement of the drive means the surfaces interact with the balls to move the wedge plunger by a relatively small amount.

2. An adjuster according to claim 1, wherein the drive means comprises a fine adjustment knob, a drive screw fixed to the knob, a drive pin engaged with the drive screw and movable axially in the mean body, the drive pin carrying the second tapered surface.

3. An adjuster according to claim 2, including a spring between the drive pin and the wedge plunger.

4. An adjuster according to claim 3, wherein the drive pin is hollow, the spring extending at least partly in the drive pin.

5. An adjuster according to claim 3, wherein the actuator pin includes a ball for engaging the second member and a ball for engaging the wedge plunger.

6. An adjuster according to claim 1, including a spring between the wedge plunger and the coarse adjustment body.

7. An adjuster according to claim 6, including a spring between the drive means and the wedge plunger.

8. An adjuster according to claim 7, wherein the drive means comprises a fine adjustment knob, a drive screw fixed to the knob, a drive pin engaged with the drive screw and movable axially in the mean body, the drive pin carrying the second tapered surface.

9. An adjuster according to claim 8, wherein the coarse adjustment body includes a counter bore, the adjustment knob being engagable axially into the counter bore and over the mean body.

* * * * *